United States Patent [19]

Seltenheim et al.

[11] 4,301,205
[45] Nov. 17, 1981

[54] DEVICE FOR FASTENING OBJECTS ON A FLAT SUPPORT MEMBER

[75] Inventors: Volker Seltenheim, Gerolzhofen; August Schubert, Geldersheim; Peter Paschakarnis, Schwebheim; Josef Vonderau, Bad Neustadt; Frank Ilzig; Walter Frosch, both of Schweinfurt; Egon Füglein, Aachen, all of Fed. Rep. of Germany

[73] Assignee: Fichtel & Sachs A.G., Schweinfurt, Fed. Rep. of Germany

[21] Appl. No.: 58,668

[22] Filed: Jul. 18, 1979

[30] Foreign Application Priority Data

Jul 20, 1978 [DE] Fed. Rep. of Germany ....... 2831895

[51] Int. Cl.³ .......................... B32B 3/02; B32B 7/06
[52] U.S. Cl. ..................................... 428/127; 40/594; 40/603; 40/618; 156/60; 156/229; 156/344; 427/208.4; 428/332; 428/343; 434/426; 434/430

[58] Field of Search ................ 156/60, 291, 344, 229; 427/207 B, 207 C; 428/214, 343, 332, 39, 40, 127; 35/28; 40/158 R, 360, 594, 603, 617, 618; 43/114, 115; 160/328, 384; 434/426, 430

[56] References Cited

U.S. PATENT DOCUMENTS

| | | | |
|---|---|---|---|
| 3,389,784 | 6/1968 | Hendricks et al. | 206/47 |
| 3,409,257 | 11/1968 | Elm | 248/65 |
| 3,922,421 | 11/1975 | Frank | 428/214 |

Primary Examiner—Robert A. Dawson
Attorney, Agent, or Firm—Toren, McGeady & Stanger

[57] ABSTRACT

A device for fastening an object to a flat support member is disclosed. The device includes an adhesive coating of at least 0.35 mm which is applied to the support member or the object. The coating may be provided on a table plate, a sideboard or tray as a support. The coating may be applied to a foil element which may be used in different ways in providing a releasably attachable arrangement.

2 Claims, 7 Drawing Figures

U.S. Patent  Nov. 17, 1981  4,301,205

DEVICE FOR FASTENING OBJECTS ON A FLAT SUPPORT MEMBER

FIELD OF THE INVENTION

The present invention relates to a device and arrangement for removably fastening an object to a support member, particularly by means of an adhesive coating.

BACKGROUND OF THE INVENTION

From the teachings of U.S. Pat. No. 3,389,784, a first aid box is known whose contents are releasably glued in sections to dividing foils which are coated with an adhesive. Moreover, from the teachings of U.S. Pat. No. 3,409,257, it is known to provide an adhesive coating on the backside of a cable clip, the adhesive coating serving to fasten the cable clip onto the wall along which the cable is to be laid. The adhesive coating is usually only relatively thin, as a rule, less than 1/10 mm. This has the disadvantage that the adhesive coating becomes useless relatively quickly due to contamination and loses its adhesiveness. The type of first aid box known from U.S. Pat. No. 3,389,784 would be such that the objects can only be taken off a few times. The cable clip of the U.S. Pat. No. 3,409,257 presumably loses its adhesiveness after being taken off once.

It is an object of the invention to show a way in which objects can be removably fastened to a flat support member by means of an adhesive coating, wherein the adhesive coating does not lose its adhesiveness even when the objects are taken off frequently and when the contamination is relatively heavy.

SUMMARY OF THE INVENTION

In accordance with the invention, the object is achieved by providing an adhesive coating with a thickness of at least 0.35 mm to the support member or to the object.

For a better understanding of the present invention, reference is made to the following description and accompanying drawings while the scope of the invention is pointed out in the appended claims.

DESCRIPTION OF THE PREFERRED EMBODIMENTS

The examples which shall be explained in detail hereinbelow all show devices for fastening objects on flat support members in which an adhesive coating with a thickness of at least 0.35 mm is applied on the support member or the object. The thickness of the adhesive coating is preferably between 0.5 and 2 mm. This results in the advantage in all of the devices described in the following that the object adheres extremely well to the flat support member independently from the shape of the object, i.e., even when it has strongly curved surfaces, and that the adhesive coating is not affected by contamination since, due to its thickness, it is able to pick up dirt particles and the like so that the surface maintains its adhesiveness even when the object is frequently taken off the flat support member.

Figure 1:
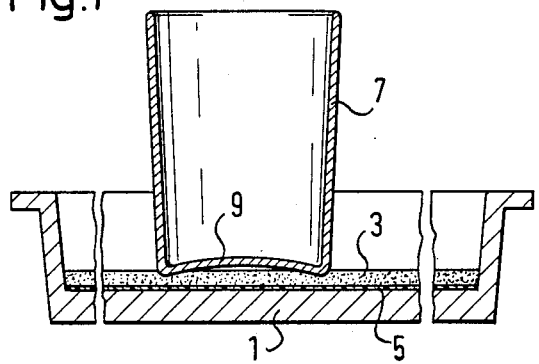
FIG. 1 shows a schematic cross section through a tray with a cup placed thereon.

FIG. 1 shows a tray which, on the upper side of its plate-like tray bottom 1, carries a thick adhesive coating 3 of the above-described type. The adhesive coating 3 is applied on a foil 5 which, in turn, is releasably glued to the tray bottom 1 by means of an adhesive, not shown. The composite material of adhesive coating 3 and foil 5 can be replaced as a unit when the adhesiveness of the adhesive coating 3 should deteriorate after long use. On the adhesive coating 3 of the tray there is placed a cup 7 which, in spite of its arched bottom 9, is securely fastened to the tray since the adhesive coating 3 adjusts to the contours of the bottom 9 due to its thickness.

In the same manner, adhesive coatings can also be applied on sideboards, tables, etc,. particularly for the use in airplanes, ships, autobuses etc. In reversing the principle of FIG. 1, the adhesive coating can also be applied on the bottom of an object to be fastened, for example, a cup or plate, so that the cup or plate can be put down in such a manner that it is secure against tilting and stable.

Figure 2:
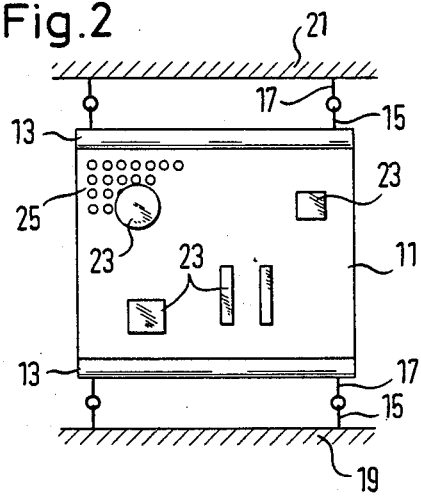
FIG. 2 shows a front view of a device suitable for storing objects.
Figure 3:
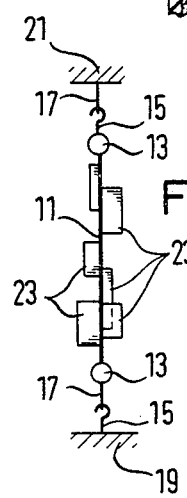
FIG. 3 shows a side view of the device according to FIG. 2.

FIGS. 2 and 3 show a foil 11 which is coated on both sides with an adhesive coating. The foil 11 is fastened to clamping bars 13 along two opposite edges. The clamping bars 13 are fastened to the floor 19 and the sealing 21 of a room in a building by means of hooks 15 and eyes 17. Objects 23 can be attached to both sides of the foil 11 which is vertically stretched in this manner. The adhesive coating may be applied continuously on the foil 11; however, as shown in FIG. 2 at 25, the coating may also be applied in a pattern of locally limited regions of adhesive coating. The regions of adhesive coating may have the shape, for example, of circles, drops or strips. The adhesiveness can be adjusted by the size and the manner of arranging the regions of adhesive coating. Regions of adhesive coating can also be achieved thereby that a continuous adhesive coating is covered with a foil which had openings corresponding to the pattern of the regions of adhesive coating.

Figure 4:
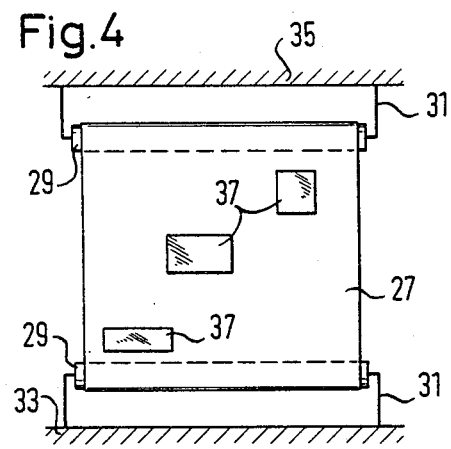
FIG. 4 shows a front view of another device suitable for storing objects.
Figure 5:
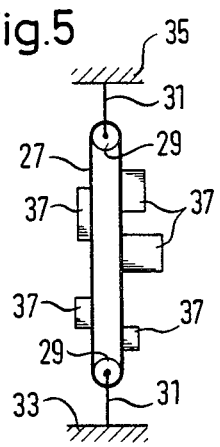
FIG. 5 shows a side view of the device according to FIG. 4.

FIGS. 4 and 5 show another embodiment in which a foil 27, which is connected to form an endless belt and is provided with a thick adhesive coating on its outer side, is guided over two rollers 29 which are arranged parallel one above the other with a spacing between each other. The rollers 29 are rotatably supported on supports 31 which, in turn, are fastened to the floor 33 and the ceiling 35 of a room of a building. Objects 37 can again be attached to the adhesive coating of the foil 27. By means of the device shown in FIGS. 4 and 5, the space in high rooms can be well utilized since the objects 37 to be stored are attached in the lower region of the foil 27 and can be moved upwardly together with the foil 27.

Figure 6:
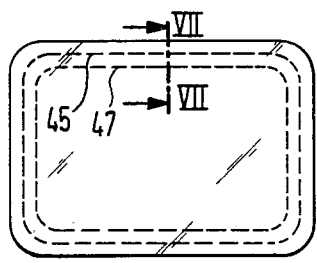
FIG. 6 shows a top view of a spare windshield for a motor vehicle.
Figure 7:
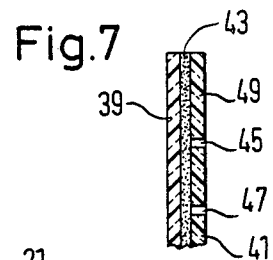
FIG. 7 shows a sectional view through the windshield according to FIG. 6 along the line VII—VII.

FIGS. 6 and 7 show a spare windshield for a motor vehicle, wherein an adhesive coating 43 is provided between two transparent foils 39,41. The adhesive coating 43 is adjusted in such a way that it adheres more strongly to the foil 37 than to the foil 39. Approximately parallel to the outer edge of the foil 37, in the foil 39 two perforations 45,47 are provided which extend with a distance relative to each other and to the edge. Along the perforations 45,47, a circular strip 49 of optional width can be separated from the foil 41 and the adhesive coating 43 arranged under the foil can be exposed. The spare windshield is attached along the exposed adhesive coating 43 to the flat portions of the body of the motor vehicle which are located adjacent to the windshield.

As described above, the invention is directed toward the provision of an adhesive coating of at least 0.35 mm to a support member or to an object for fastening. The adhesive coating preferably has a thickness of between 0.5 mm and 2 mm. When the adhesive coatings have such a thickness, the object to be fastened is embedded in the coating so that it is possible without problems to securely fasten even rolling objects, i.e., objects having an indifferent position of equilibrium, such as, for example, balls. It has been found that such thick adhesive coatings are much better able to absorb dynamic forces which act from outside on the object, without the object being disconnected from the adhesive coating. Furthermore, thick adhesive coatings are better protected against unwanted breaks of the cohesion within the adhesive coating. Due to the thickness, such adhesive coatings are able to pick up dirt particles better in larger numbers without losing their adhesiveness. As a result, the adhesive coating can be used longer.

The adhesive coating can be provided on a table plate or on a support board or on a tray, so that such supports can be used in on-board kitchens or airplanes, ships or motorbuses for a stable storage of dishes and the like. The invention can be used in camping tables which tilt easily or also for a stable storage of objects, for example, in stores or shops for china and glass.

To be able to replace the adhesive coating if necessary, it is preferably applied on a carrier foil, which, in turn, is glued to the support member by means of an adhesive coating.

As described in the above embodiments, the support member may be formed by a rigid plate or the like; however, it may also consist of a foil which is stretched between two clamping members and is provided on at least one side with an adhesive coating. For example, the foil may be stretched so as to extend vertically and may serve as a carrier for displaying goods in stores. The foil may form an endless belt which is rotatably guided on rollers which are arranged at a distance between each other and are supported on the clamping members. In this manner, the foil can be moved perpendicularly relative to the axis of the rollers. When the rollers are arranged, for example, one on top of the other, the objects can be attached in the lower region of the foil which can be easily reached and can then be moved together with the foil in a region which is more difficult to reach.

The invention can also be used in a repeatedly usable spare windshield for a motor vehicle. For this purpose, the adhesive coating is provided between two transparent foils, one of which having a tear-off perforation or a punched cut extending parallel to and at a distance from its edge. The edge of this one foil can be pulled off along the tear-off perforation or the punched cut, so that the composite foil can be glued by means of the adhesive coating of the other foil to those parts of the body of the motor vehicle which are adjacent to the windshield. When several tear-off perforations or punched cuts are provided, the size of the spare windshield can be adjusted to the size of the windshield to be replaced.

Other arrangements on which the adhesive coating is provided on the object to be fastened are plates, flower pots, glasses etc. which carry the adhesive coating at the bottoms. Objects of this kind can be fixed to the support in this manner. As a result, they cannot tilt over and, if they are very fragile, they cannot be damaged upon a slight unintentional contact. The objects can also be carriers for advertisements or warning, traffic and indicating signs which can be used for a limited time, for example, for the task of directing traffic.

To be able to adjust the adhesiveness of the adhesive coating, the coating may be applied on the support member or the object in a pattern which at least partially covers the surface. For example, drip-like or strip-like patterns are suitable. However, in reversing this principle, the adhesive coating can also be covered by a cover foil which is provided with openings.

While the foregoing description and drawings represent the preferred embodiments of the present invention, it will be obvious to those skilled in the art that various changes and modifications may be made therein without departing from the trud spirit and scope of the present invention.

We claim:

1. A device for detachably fastening objects of varying size and shape thereto so as to temporarily hold such objects comprising a member having a flat surface and having means for being attached to a support therefor, wherein the flat surface is coated with a layer of pressure sensitive adhesive having a thickness between 0.5 and 2 mm and wherein the flat surfaced member is a foil stretched between two clamping members.

2. A device according to claim 1, wherein said foil forms an endless belt, said belt being guided over rotatably supported rollers of said clamping members, said rollers being arranged with a spacing between each other.

* * * * *